(12) United States Patent
Asano et al.

(10) Patent No.: US 12,186,963 B2
(45) Date of Patent: Jan. 7, 2025

(54) ANTIFOULING METHOD FOR POLYSILICON

(71) Applicant: Tokuyama Corporation, Yamaguchi (JP)

(72) Inventors: Takuya Asano, Yamaguchi (JP); Satoko Yoshimura, Yamaguchi (JP)

(73) Assignee: Tokuyama Corporation, Yamaguchi (JP)

(*) Notice: Subject to any disclaimer, the term of this patent is extended or adjusted under 35 U.S.C. 154(b) by 727 days.

(21) Appl. No.: 17/285,966

(22) PCT Filed: Oct. 29, 2019

(86) PCT No.: PCT/JP2019/042330
§ 371 (c)(1),
(2) Date: Apr. 16, 2021

(87) PCT Pub. No.: WO2020/090804
PCT Pub. Date: May 7, 2020

(65) Prior Publication Data
US 2021/0339450 A1    Nov. 4, 2021

(30) Foreign Application Priority Data

Oct. 31, 2018 (JP) .................. 2018-205330

(51) Int. Cl.
*B29C 48/28* (2019.01)
*B29C 48/10* (2019.01)
(Continued)

(52) U.S. Cl.
CPC .............. *B29C 48/28* (2019.02); *C01B 33/02* (2013.01); *C08J 5/18* (2013.01); *B29C 48/10* (2019.02);
(Continued)

(58) Field of Classification Search
CPC ......... B29C 48/28; B29C 48/10; B29C 48/08; B29C 48/0022; B29C 48/0018;
(Continued)

(56) References Cited

U.S. PATENT DOCUMENTS 7,013,620 B2    3/2006    Hölzlwimmer et al.
10,301,181 B2    5/2019    Vietz et al.
(Continued)

FOREIGN PATENT DOCUMENTS

DE    102 04 176 A1    8/2003
EP    3199472 A1    8/2017
(Continued)

OTHER PUBLICATIONS

British Plastics Federation, "Polyethylene (Low Density) LDPE, LLDPE", 2024-Evidence, Not Prior Art (Year: 2024).*
(Continued)

*Primary Examiner* — Alex B Efta
*Assistant Examiner* — Alexander S Wright
(74) *Attorney, Agent, or Firm* — CAHN & SAMUELS, LLP

(57) ABSTRACT

An antifouling method for polysilicon includes using a tube-shaped resin sheet having an inner surface and an outer surface to prevent the fouling of polysilicon, in which the tube-shaped resin sheet or a resin sheet cut out of the tube-shaped resin sheet is held, with the inner surface being kept in an unexposed state, and the inner surface is exposed just before use and brought into contact with the polysilicon.

9 Claims, 3 Drawing Sheets

(51) Int. Cl.
  *B29K 23/00*  (2006.01)
  *C01B 33/02*  (2006.01)
  *C08J 5/18*  (2006.01)

(52) U.S. Cl.
  CPC ... *B29K 2023/0633* (2013.01); *C08J 2323/06* (2013.01)

(58) Field of Classification Search
  CPC ..... B29C 48/022; B29C 48/305; B29C 48/32; C01B 33/02; C01B 33/035; C08J 5/18; C08J 2323/06; B29K 2023/0633; B29K 2023/06; B29K 2083/00; B26D 7/27; B08B 17/02
  See application file for complete search history.

(56) References Cited

U.S. PATENT DOCUMENTS

| | | | |
|---|---|---|---|
| 10,456,577 | B2 | 10/2019 | Calle et al. |
| 2005/0034430 | A1* | 2/2005 | Holzlwimmer ........... B65B 1/32 53/469 |
| 2010/0001106 | A1 | 1/2010 | Schaefer et al. |
| 2012/0198793 | A1* | 8/2012 | Vietz ..................... B65B 9/2042 222/77 |
| 2017/0342595 | A1 | 11/2017 | Miyao et al. |
| 2018/0223450 | A1 | 8/2018 | Miyao et al. |

FOREIGN PATENT DOCUMENTS

| | | | |
|---|---|---|---|
| GB | 1527065 | A | 10/1978 |
| JP | 2004168371 | A | 6/2004 |
| JP | 2008174309 | A | 7/2008 |
| JP | 4142411 | B2 * | 9/2008 |
| JP | 2017056959 | A | 3/2017 |
| JP | 2017524632 | A | 8/2017 |
| WO | 0117853 | A1 | 3/2001 |
| WO | WO-2010007848 | A1 * | 1/2010 ............. B32B 37/28 |

OTHER PUBLICATIONS

English Abstract for JP2017524632 A, Aug. 31, 2017.
English Abstract for JP2008174309 A, Jul. 31, 2008.
English Abstract for JP2017056959 A, Mar. 23, 2017.
English Abstract of JP2004168371A, Jun. 17, 2004.
EPO, Extended European Search Report, dated Jul. 4, 2022.
English Abstract of WO2010007848A1, Jan. 21, 2010.
International Preliminary Report on Patentability for Application No. PCT/JP2019/042330, dated Apr. 2021.

* cited by examiner

ANTIFOULING METHOD FOR POLYSILICON

This application is a U.S. national stage application of PCT/JP2019/042330 filed on 29 Oct. 2019 and claims priority to Japanese patent document 2018-205330 filed on 31 Oct. 2018, the entireties of which are incorporated herein by reference.

TECHNICAL FIELD

The present invention provides a novel antifouling method for polysilicon. Specifically, the present invention relates to an antifouling method for polysilicon which prevents surface contamination as much as possible until use, and enables to significantly reduce contamination against polysilicon caused by a resin film which is used for antifouling the polysilicon.

BACKGROUND

When polysilicon is transported or stored in a rod form, a cut rod form, a pulverized formed, a powder form, and the like, the polysilicon is covered with a resin film to prevent contamination caused by surrounding environment of the polysilicon, thereby antifouling of polysilicon is done. Polysilicon requires high purity; hence this antifouling treatment is performed not only in the air but also in a cleanroom.

As the above-mentioned resin film used for antifouling, in order to prevent contamination of the polysilicon by the resin film, for example, an additive-free resin film is used in general which does not cause bleeding of metal components and organic material components. The above-mentioned antifouling treatment is performed to polysilicon, by unrolling and cutting the resin film to an appropriate length then placing over the polysilicon; or in some cases the resin film may be placed under the polysilicon (Patent Document 1 and Patent Document 2).

As discussed in above, even though the inside of the resin film has extremely high purity, a surface of the resin film used for antifouling is exposed and contaminated by the air immediately after the production until it is used. The present inventors have found that the above-mentioned resin film for antifouling is highly contaminated at the time of use by contaminants such as metal components, organic material components, dopant components, and the like which are included in the air. In a production method of the resin film, the resin pushed out from T-die of an extrusion machine is elongated depending on needs to form a sheet form, then rolled-up to form a roll form. However, when this is being performed, the surface of the resin film may contact with the air or with other contamination sources, thereby the contaminants adhere to the surface. As a result, when the resin film is rolled-up, the surface contamination of the resin film is already progressed. As such contaminating sources, a roller and the like used for rolling up the resin film may also be mentioned.

Note that, in some cases, the resin film may be produced by an inflation method using a circular die. In such case, a resin film of a cylindrical shape composed of an inner surface and an outer surface is obtained, and the inner surface has a high cleanness. However, in general, when it is used as the resin film, both ends along longitudinal side of the cylindrical resin film are cut and rolled-up by separate rolls; or only one end along longitudinal side is cut and then rolled-up by opening the resin film. When the resin film is rolled-up, similar contaminations mentioned in above may occur.

Also, when the polysilicon is covered by the contaminated resin film, the polysilicon may be contaminated by the contaminants adhered to the resin film.

Patent Document 1: JP Patent Application Laid Open No. 2017-524632
Patent Document 2: JP Patent Application Laid Open No. 2017-56959

SUMMARY

Therefore, the object of the present invention is to provide an antifouling method capable of effectively preventing contamination of the polysilicon caused by the resin film.

The present inventors have carried out keen examination and found that the object of the present invention can be attained by using a cylindrical resin film for keeping an inner surface of the tube away from contacting with the air until right before use, and then exposing the inner surface right before use to contact the polysilicon and the inner surface. Thereby, the present invention was attained.

That is, one aspect of an embodiment of the present invention is an antifouling method for polysilicon using a cylindrical resin film composed of an inner surface and an outer surface, wherein the method includes steps of holding the cylindrical resin film so that the inner surface is kept unexposed, cutting the cylindrical resin film so that the inner surface can be exposed right before use, and contacting a polysilicon and the exposed inner surface.

Other aspect of an embodiment of the present invention is an antifouling method for polysilicon using a cylindrical resin film composed of an inner surface and an outer surface, wherein the method includes steps of cutting the cylindrical resin film so that the inner surface can be exposed, holding the cylindrical resin film o that the inner surface is kept unexposed, and contacting a polysilicon and the inner surface by exposing the inner surface right before use.

In the above-mentioned antifouling method, an abundance amount of iron at the inner surface of the cylindrical resin film right before use may be preferably 1 pg/cm$^2$ or less in terms of an iron element. Also, a puncture strength of the resin film may preferably be 10 N or more.

Also, the resin film may preferably be an additive-free polyethylene sheet in order to prevent contamination at inside of the resin film by impurities.

Further, a method for producing polysilicon is provided in which the contamination from the antifouling sheet is effectively prevented according to the method of the present invention.

Furthermore, the present invention also provides an antifouling resin film for polysilicon wherein the antifouling resin film is made of a roll form by rolling-up a cylindrical resin film so that an inner surface of the cylindrical resin film is unexposed. Furthermore, the present invention provides an antifouling resin film for polysilicon, wherein a cylindrical resin film is a cut so that an inner surface of the cylindrical resin film can be exposed, and the cylindrical resin film is rolled into a roll form so that that the inner surface is kept unexposed.

According to the present invention, by using the cylindrical resin film, the resin film is held so that the inner surface of the cylindrical resin film is kept unexposed, then the inner surface is exposed right before use, hence a clean resin film with no contamination can be contacted with the polysilicon, thereby antifouling can be done by contacting the polysilicon and the resin film with no contamination by the air and the like. Hence, the contamination of the polysilicon can be effectively prevented.

DETAILED DESCRIPTION

Figure 1:
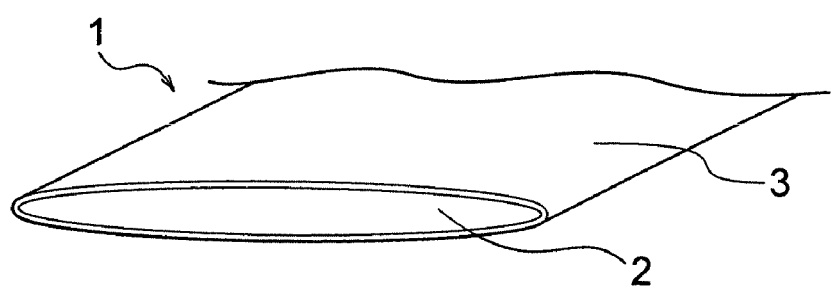
FIG. 1 shows a cylindrical resin film.

As mentioned in above, an antifouling method for polysilicon according to one embodiment of the present invention uses a cylindrical resin film composed of an inner surface and an outer surface, and the method includes steps of cutting the cylindrical resin film so that an inner surface can be exposed, holding the cylindrical resin film so that the inner surface is kept unexposed, and contacting a polysilicon and the exposed inner surface right before use. FIG. 1 shows a cylindrical resin film 1 composed of an inner surface 2 and an outer surface 3. As shown in FIG. 1, the inner surface 2 is restricted from contacting with the air and other machines, hence it is in a clean state. In the present invention, the resin film 10 is prepared which is cut so that the inner surface 2 of the above-mentioned cylindrical resin film 1 can be exposed. A method of cutting is not particularly limited, and all methods which enables to expose the inner surface 2 are included. Note that, in the resin film 10 obtained by cutting the cylindrical resin film 1, the inner surface 2 is adhered to itself, thus the inner surface 2 is unexposed.

Figure 2A:
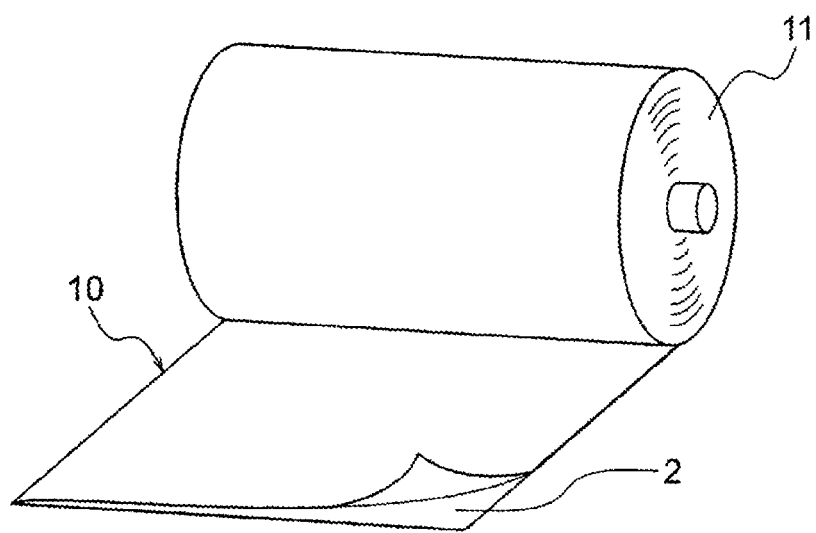
FIG. 2a is a schematic diagram showing one embodiment of a resin film used for an antifouling method according to the present invention.
Figure 2B:
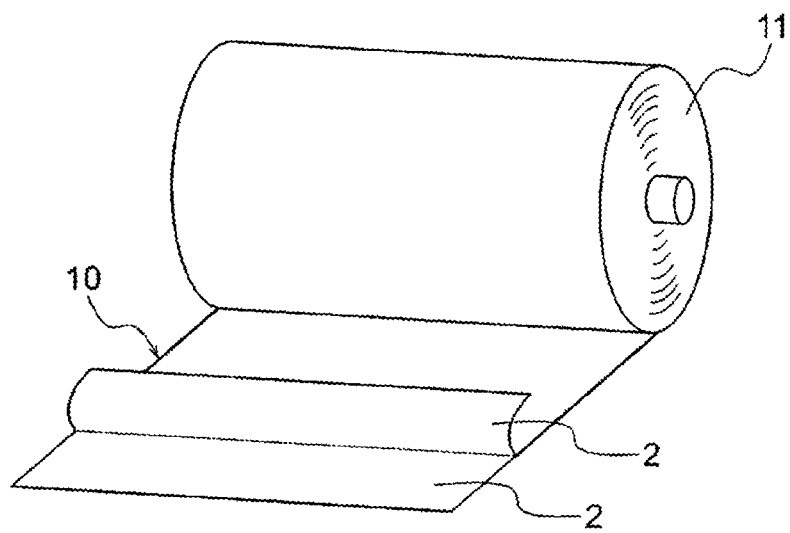
FIG. 2b is a schematic diagram showing one embodiment of a resin film used for an antifouling method according to the present invention.
Figure 2C:
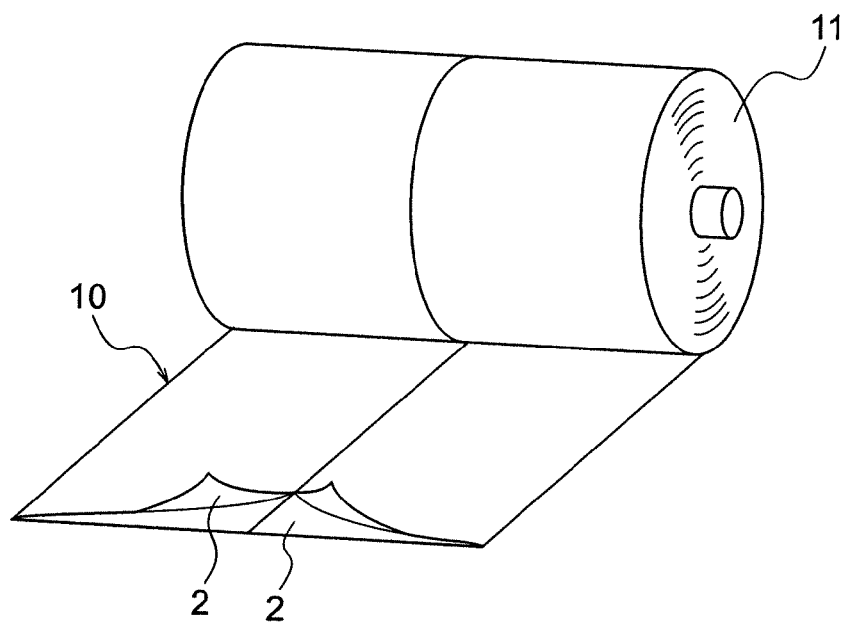
FIG. 2c is a schematic diagram showing one embodiment of a resin film used for an antifouling method according to the present invention.

FIG. 2a to FIG. 2c show representative embodiments of the resin film of which the inner surface of the cylindrical resin film 1 can be opened and kept in an unexposed state. FIG. 2a shows the resin film 10 of which a cut is made at one side along a longitudinal direction of the cylindrical resin film. The resin film of this embodiment can be rolled-up into a roll form without opening the cut and forms a roll 11, hence the inner surface 2 can be kept in an unexposed state. Then, at the time of using the resin film, the resin film 10 is unrolled from the above-mentioned roll 11, then the resin film 10 is opened from the side where the cut is made, and the inner surface 2 is contacted with the polysilicon.

FIG. 2b shows a resin film 10 of which both sides are cut along the longitudinal direction of the cylindrical resin film. In the resin film of this embodiment, the inner surface 2 is adhered to itself and forms a two-layer sheet, and the resin film can be rolled without releasing the two layers and forms a roll 11. Hence, the inner surface 2 of the resin film can be held while keeping an unexposed state. Then, at the time of using the resin film, the resin film 10 is unrolled from the above-mentioned roll 11, and the two layers are released, then the surface which is the inner surface side is contacted with the polysilicon.

FIG. 2c is a modification example of FIG. 2a, and shows a resin film 10 of which the cylindrical resin film is cut at a center part along the longitudinal direction. In the resin film of this embodiment, the resin films shown in FIG. 2a are aligned alongside. At the time of using this resin film, the resin film 10 is unrolled from the roll 11, and one side is opened from where the cut was made and the inner surface 2 is contacted with the polysilicon.

Also, as an embodiment of the present invention, the cylindrical resin film may be rolled-up and held so that the inner surface is kept unexposed, then the cylindrical resin film may be unrolled and the cylindrical resin film may be cut as shown in FIG. 2a to FIG. 2c right before use.

Note that, in the present invention, "antifouling" is a means using the sheet to protect the polysilicon from contaminations from surrounding environment. Specifically, a method of covering the polysilicon which is placed for storage and the like by the sheet; a method of placing the sheet under the polysilicon; a method of wrapping the polysilicon, and the like may be included. Also, when the polysilicon is being transported, a method of placing the polysilicon on the sheet provided at a bottom of the container for transportation; a method of covering the polysilicon placed in the container; and the like may be included. Since polysilicon requires a high purity, the above-mentioned methods are performed not only in the open air but also in a cleanroom as well. Though a cleanroom is extremely clean, when polysilicon is left for a long period of time, contamination progresses. Therefore, by using the antifouling method of the present invention in a cleanroom, polysilicon can be maintained in a clean state for long period of time.

Also, "inner surface" in the present invention refers to a surface at the inner side of the cylindrical resin film 1. In the present invention, the cylindrical resin film 1 is cut and opened to be used as the resin film 10. Also, "inner surface" of the resin film refers to the surface which is the surface at the inner side of the cylindrical resin film 1 before being exposed.

Also, a form of the above-mentioned polysilicon is not particularly limited, and for example, a rod form which is taken out from a reactor of a Siemens method, a cut rod of which the rod has been cut, a crushed polysilicon obtained by crushing the above-mentioned rod, or the like may be included. In general, after crushing the polysilicon, etching or so may be performed for washing, and a clean surface condition is obtained. The antifouling method according to the present invention may be used for polysilicon of before or after washing.

Figure 3:
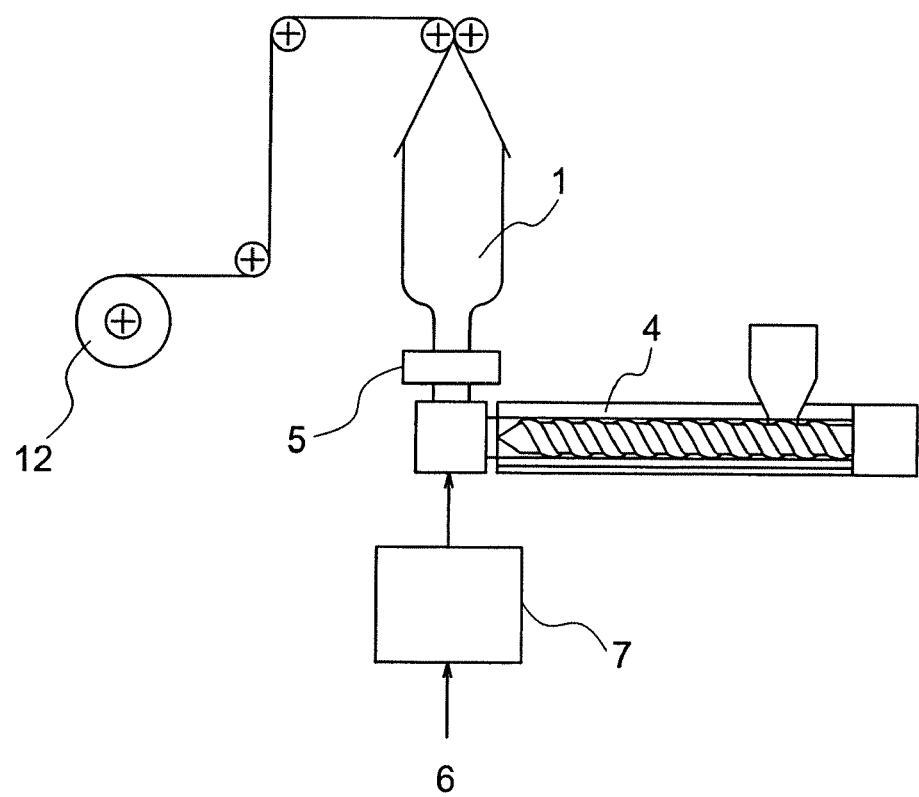
FIG. 3 is a schematic diagram showing representative steps of production of a cylindrical resin film.

In the present invention, the cylindrical resin film 1 is not particularly limited, and those obtained by a known method such as an inflation method and the like may be used. Specifically, as shown in FIG. 3, a resin is pushed out in a cylinder form using an extrusion machine 4 having a circular die 5, and if necessary, it is elongated using a mandrel to form the cylindrical resin film 1, and then rolled-up to obtain a roll 12. At the time of use, the roll 12 may be unrolled and cut as mentioned in above to obtain the resin film 10. Also, before the cylindrical resin film 1 is rolled-up, it may be cut as mentioned in above to obtain the resin film 10 of the present invention and then it may be rolled to obtain a roll 11. Also, in order to form the cylindrical resin film 1, the air provided by a blower 6 may preferably be a clean air for forming the inner surface of the obtained cylindrical resin film. Specifically, the air containing 10 particles/L or less of a particle having a size of 0.3 μm may be preferably used.

Hence, a filter 7 may be provided between the blower 6 and the die 5. As for the filter 7, for example, HEPA filter and the like may be used.

Also, the used resin is not particularly limited as long as it is a thermoplastic resin. As an inexpensive resin with an appropriate flexibility, polyethylene based resins such as low density polyethylene (LDPE), high density polyethylene (HDPE), linear low density polyethylene (LLDPE), and the like may be preferably used.

Further, a thickness of the resin film may be determined depending on a shape, size, and mass of the polysilicon, and in general it is preferably 50 µm to 2 mm, and more preferably 150 to 300 µm. Also, a puncture strength of the resin film is preferably 10 N or more.

Further, the resin constituting the resin film may be free of additives such as an antistatic agent, a plasticizer, an antioxidant, and the like from the point of suppressing contamination caused by bleeding of metal elements and organic materials derived from the additives.

The above-mentioned cylindrical resin film is constantly maintained in a clean condition as the inner surface does not contact with the air while being produced until it is rolled-up. For example, in the antifouling method, a sample of the resin film right before use is confirmed to have a cleanness of 1 $pg/cm^2$ or less of an iron amount in terms of iron element at the inner surface. On the other hand, an iron amount at the surface of the resin film contaminated by the air is usually 10 $pg/cm^2$ or so. Also, as long as the iron amount is within the range of 1 $pg/cm^2$ or less, amounts of other metal elements are also reduced to similar level. For example, a sodium amount can be 2 $pg/cm^2$ or less, a calcium amount can be 5 $pg/cm^2$ or less, and a zinc amount can be 1 $pg/cm^2$ or less.

By utilizing the above-mentioned characteristics of the cylindrical resin film, the present invention effectively prevents polysilicon contamination when the resin film is used for antifouling. That is, the antifouling method according to the present invention includes all embodiments which keeps the inner surface of the cylindrical resin film unexposed, and then exposing the inner surface of the right before used for antifouling. Specifically, following embodiments may preferably be included.

1. An antifouling method in which the cylindrical resin film is rolled-up and held as a roll, and the roll is unrolled upon using to cut the cylindrical resin film as mentioned in above, then the surface which is the inner surface of the cylindrical resin film is opened to contact with the polysilicon for antifouling.

2. An antifouling method in which the cylindrical resin film is cut in the production steps of the resin film and at the same time resin film is stacked in two layers so that the inner surface is unexposed, and the resin film is rolled-up and held in a roll, then the resin film is unrolled from the roll and the inner surface of the cylindrical resin film is opened to contact with the polysilicon for antifouling.

3. An antifouling method in which the cylindrical resin film is cut and held in a form of a roll as mentioned in above, then the resin film which has been cut is unrolled from the roll, and the surface which is the inner surface of the cylindrical resin film is opened and contacted with the polysilicon for antifouling.

According to the antifouling method of the above-mentioned present invention, the clean surface of the resin film and the polysilicon are contacted, thus contamination caused from the resin film can be effectively prevented.

Note that, even in case the resin film is produced by an inflation method, if the both ends along longitudinal side of the resin film are cut immediately after the production and then the resin films are rolled into separate rolls, the both surfaces of the resin film are contaminated by contacting with the air and a winding roll. As a result, if such resin film is used for antifouling the polysilicon, an antifouling property may be insufficient. Thus, it is extremely important for achieving the effects of the present invention to roll-up the resin film without exposing the inner surface.

EXAMPLES

Hereinbelow, embodiments of the present invention are described, however the present invention is not limited to these embodiments.

Example 1

(Production of Cylindrical Resin Film)

Polyethylene (LDPE) which did not include additives such as an antistatic agent and the like was inflation molded using a machine shown in FIG. 3, thereby a cylindrical resin film was obtained. A thickness of the sheet was 250 µm (a puncture strength of 10 N or more was satisfied). The obtained cylindrical resin film was rolled-up and a roll was obtained. Note that, for inflation molding, the air was used which was regulated so that a particle having a size of 0.3 µm was 10 particles/L or less.

(Cutting Cylindrical Resin Film)

The cylindrical resin film was unrolled and also at the same time one side along the longitudinal direction of the sheet was cut as shown in FIG. 2a. Then, the sheet was opened from the side where the cut was made to expose an inner surface, and the inner surface side and polysilicon were brought into contact, thereby polysilicon was covered by the resin film. The above procedures were performed in a class 1000 cleanroom. Following evaluations were performed.

(Amount of Metal)

Metal amounts at the inner surface and outer surface of the resin film were measured as follows. Metals adhered to the surface of the resin film were extracted from a measurement target surface of the resin film using a nitric acid aqueous solution having a concentration of 1 mass % as an extraction liquid. Then, amounts of iron, Na, Ca, and Zn as impurities were quantified by ICP-MS (inductively coupled plasma mass spectroscopy). The measurements were performed to 10 samples obtained by cutting the resin film into a size of 50 cm×50 cm. An average is shown in Table 1.

(Evaluation of Antifouling Property)

After covering the polysilicon by the resin film, the resin film covered polysilicon was left for 10 days in a class 1000 cleanroom. Surface contamination of the polysilicon was evaluated as follows. Metals adhered to the surface of the polysilicon were extracted using a nitric acid aqueous solution having a concentration of 1 mass % as an extraction liquid. Then, amounts of iron, Na, Ca, and Zn as impurities were quantified by ICP-MS (inductively coupled plasma mass spectroscopy). Ten polysilicon fragments were selected arbitrarily and were defined as one unit, and the measurements were performed to ten units. An average value is shown in Table 2.

Comparative Example 1

Same procedures were performed except that the antifouling of the polysilicon was performed to the outer surface (the surface which was the outer surface of the tube) of the resin, and was contacted with the polysilicon. Results are shown in Table 2.

TABLE 1

Surface Analysis Result of Polyethylene Resin Film (pg/cm²)

|  | Na | Ca | Fe | Zn |
|---|---|---|---|---|
| Inner Surface | 1.5 | 1.1 | <1 | <1 |
| Outer Surface | 16.6 | 50.8 | 8.4 | 13.7 |

TABLE 2

Polysilicon Contamination (pptw)

|  | Na | Ca | Fe | Zn |
|---|---|---|---|---|
| Example 1 | <10 | <20 | <10 | <10 |
| Comparative example 1 | >30 | >40 | >40 | >30 |

NUMERICAL REFERENCES

1 . . . Cylindrical resin film
2 . . . Inner surface
3 . . . Outer surface
4 . . . Extrusion machine
5 . . . Circular die
6 . . . Blower
7 . . . Filter
10 . . . Resin film (already cut)
11 . . . Roll of resin film
12 . . . Roll of cylindrical resin film

What is claimed is:

1. An antifouling method for polysilicon using a cylindrical resin film composed of an inner surface and an outer surface, wherein the method comprises:
 holding the cylindrical resin film so that the inner surface is kept unexposed,
 cutting the cylindrical resin film along a longitudinal direction so that the inner surface of the cylindrical resin film is exposed right before use, and
 contacting a polysilicon material and the exposed inner surface of the cylindrical resin film.

2. An antifouling method for polysilicon using a cylindrical resin film composed of an inner surface and an outer surface, wherein the method comprises:
 cutting the cylindrical resin film along one side in a longitudinal direction so that the inner surface is exposable,
 rolling up the cylindrical resin film without opening the cut,
 holding the cut cylindrical resin film so that the inner surface is kept unexposed,
 at the time of use, unrolling the cylindrical resin film and opening the film from the side where the cut was made to expose the inner surface, and
 contacting a polysilicon material and the exposed inner surface.

3. The antifouling method for polysilicon according to claim 1, wherein an amount of iron at the inner surface of the cylindrical resin film right before use is 1 pg/cm² or less in terms of an iron element.

4. The antifouling method for polysilicon according to claim 1, wherein the cylindrical resin film is an additive-free polyethylene sheet.

5. A method for producing polysilicon including the antifouling method for polysilicon according to claim 1.

6. The antifouling method for polysilicon according to claim 1, wherein said holding comprises keeping cylindrical resin film in a rolled up state, said method further comprising, right before use, unrolling the cylindrical resin film and performing said cutting.

7. The antifouling method for polysilicon according to claim 1, comprising wrapping the polysilicon material with the exposed inner surface of the cylindrical resin film.

8. The antifouling method for polysilicon according to claim 1, comprising covering the polysilicon material with the exposed inner surface of the cylindrical resin film.

9. The antifouling method for polysilicon according to claim 1, wherein the method occurs in a cleanroom.

* * * * *